United States Patent [19]

Donahue et al.

[11] 4,314,258

[45] Feb. 2, 1982

[54] INK JET PRINTER INCLUDING EXTERNAL DEFLECTION FIELD

[75] Inventors: John W. Donahue; James F. Gottman, both of Dayton, Ohio

[73] Assignee: The Mead Corporation, Dayton, Ohio

[21] Appl. No.: 117,909

[22] Filed: Feb. 4, 1980

[51] Int. Cl.[3] .............................................. G01D 15/18

[52] U.S. Cl. ........................................................ 346/75

[58] Field of Search .................................. 346/75, 140

[56] References Cited

U.S. PATENT DOCUMENTS

| | | | |
|---|---|---|---|
| 2,143,376 | 1/1939 | Hansell . | |
| 2,633,796 | 4/1953 | Pethick . | |
| 2,716,826 | 9/1955 | Huebner . | |
| 3,060,429 | 10/1962 | Winston | 346/1 |
| 3,369,252 | 2/1968 | Adams | 346/75 |
| 3,484,794 | 12/1969 | Winston | 346/75 |
| 3,500,436 | 3/1970 | Nordin | 346/75 |
| 3,586,907 | 6/1971 | Beam et al. | 346/75 X |
| 3,641,588 | 2/1972 | Metz | 346/75 |
| 3,701,998 | 10/1972 | Mathis | 346/75 |
| 3,790,703 | 2/1974 | Carley | 346/140 |
| 3,798,656 | 3/1974 | Lowy et al. | 346/75 X |
| 3,877,036 | 4/1975 | Loeffler et al. | 346/75 |
| 3,943,848 | 3/1976 | Watanabe et al. . | |
| 3,962,969 | 6/1976 | Watanabe et al. | 346/75 X |
| 4,034,379 | 7/1977 | Berry | 346/75 X |
| 4,126,711 | 11/1978 | Marlow | 346/75 X |

*Primary Examiner*—George H. Miller, Jr.

*Attorney, Agent, or Firm*—Biebel, French & Nauman

[57] ABSTRACT

An ink jet printer for depositing drops at print positions on the surface of a print receiving medium includes a print head means for generating a plurality of jet drop streams directed toward the print receiving medium, each drop in the jet drop streams being charged to one of a plurality of charge levels. A deflection means generates a static electrical deflection field extending through the print receiving medium in a direction nonparallel to the plurality of jet drop streams for deflecting charged drops in the streams to print positions on the print receiving medium. In a first embodiment, the deflection means includes a deflection electrode plate which is nonperpendicular with respect to the jet drop streams. In a second embodiment, a deflection electrode of bulk resistive material is provided.

20 Claims, 6 Drawing Figures

INK JET PRINTER INCLUDING EXTERNAL DEFLECTION FIELD

BACKGROUND OF THE INVENTION

The present invention relates to an ink jet printer and, more particularly, to a printer of the type in which each of a plurality of jet drop streams is deflected to deposit drops at a plurality of print positions on a moving print receiving medium, thereby forming a print image on the medium.

A number of prior art ink jet printers have operated in a binary manner with the drops generated in each of a plurality of jet drop streams being selectively charged in dependence upon whether the drops are to be deposited upon a print receiving medium. Such a printer is shown, for instance, in U.S. Pat. No. 3,586,907, issued June 22, 1971, to Beam et al. The selectively charged jet drop streams, arranged in a row, pass downward through an electrostatic field, perpendicular to the row and to the trajectories of the jet drop streams, so as to deflect the charged drops to a catcher. Selected drops are thereby prevented from striking the print receiving medium. The uncharged drops, however, pass through the electrostatic field unaffected and are ultimately deposited on the print receiving medium. By controlling the charging of the drops in each jet drop stream, a print image is formed on the print receiving medium.

Such a printing system, in which each jet in the jet row selectively deposits drops at a single print position on the print receiving medium is limited, in the printing resolution which may be obtained, since the print positions are spaced apart by the same distances as the jets. Due to constructional limitations, the interjet spacing between jets in a row may not be reduced below a minimum distance. In order to increase printing resolution, some jet printers have used two rows of jet drop streams, with the print lines serviced by the streams in one row interlacing with the print lines serviced by the streams in the other row or rows. Such an arrangement is shown in U.S. Pat. No. 3,701,998, issued Oct. 31, 1972, to Mathis. As additional rows of jet drop streams are added to increase resolution, alignment between the various rows of jet drop streams becomes increasingly critical. Additionally, circuitry must be provided to introduce timing delays in the print control signals controlling printing by the rows of jet drop streams, since the rows are displaced along the print receiving medium in the direction of movement of the medium.

In other printers, each of the jets in a row of jet drop streams selectively deposits drops at associated ones of a plurality of adjacent print positions spaced across a print receiving medium. Such printers are shown in U.S. Pat. No. 3,877,036, issued Apr. 8, 1975, to Loeffler et al, and U.S. Pat. No. 3,641,588, issued Feb. 8, 1972, to Metz. Typically, in such a printer a lateral deflection electrode is positioned between each of the adjacent jets in the row of jet drop streams. Electrical deflection potentials are applied to the electrodes to deflect each jet in a direction parallel to the jet row to the various print positions serviced by the jet. The insertion of the electrodes between adjacent jet drop streams, however, increase the minimum interjet spacing. Since the adjacent jets must be spaced relatively far apart, each jet is required to service a substantial number of print positions across the width of the print receiving medium, limiting the effective printing speed for a given resolution.

Another approach to providing printing at a plurality of print positions with a single jet is shown in U.S. Pat. No. 3,369,252, issued Feb. 13, 1968, to Adams. The Adams patent discloses an ink jet printer in which charged drops making up an entire horizontal print line are directed initially into a trajectory parallel to a sheet of paper upon which they are to be deposited. When the row of drops is appropriately positioned above the sheet of paper, a pair of electrodes, one positioned beneath the sheet of paper and one above the jet drops, receive an electrical deflection potential which creates a field to attract the charged drops to the sheet of paper, such that the drops all strike the paper simultaneously. The deflection field is created only periodically, with a zero field being provided during times in which a row of drops is being aligned above a sheet of paper. Since a single jet is utilized to service all of the print positions across the width of the print receiving medium, the Adams printer is extremely slow.

U.S. Pat. No. 2,633,796, issued Apr. 7, 1953, to Pethick, and U.S. Pat. No. 4,126,711, issued Nov. 21, 1978, to Marlow, both disclose jet drop printers in which a charged pattern on or beneath a drop receiving surface deflects drops from a plurality of jet drop streams to desired print positions on the print receiving surface. The Pethick device utilizes a web-supporting drum, having a conductive substrate with raised portions contacting the bottom of a web. The substrate is charged and drops issuing from a mist type printer nozzle arrangement are attracted to the web in the areas above the raised portions of the substrate.

In the Marlow printer, charges are positioned on a print receiving drum in a manner similar to that utilized in xerographic printing. Drops from a plurality of nozzles are then attracted to the charged regions of the drum, thus forming the print image. The image may thereafter be transferred to a sheet of paper.

Similarly, U.S. Pat. No. 3,943,848, issued Mar. 16, 1976, to Watanabe et al discloses an ink mist printer in which electrodes positioned behind a print receiving medium are energized, as desired, to attract ink mist droplets to the medium in the region of the electrodes.

It is seen that there is a need for an ink jet printer utilizing a row of jet drop streams in which drops in each of the streams may be deflected in a direction parallel to a row to a plurality of print positions and in which deflection electrodes are not positioned between adjacent jet drop streams in the row.

SUMMARY OF THE INVENTION

An ink jet printer for depositing drops at print positions on the surface of a print receiving medium includes print head means for generating a plurality of jet drop streams directed toward the medium. Each drop in the jet drop streams is charged to one of a plurality of charge levels. Deflection means is provided for generating a static electrical deflection field extending through the print receiving medium in a direction nonparallel to the plurality of jet drop streams for deflecting charged drops in the streams to print positions on the print receiving medium. The jet drop streams may be parallel and arranged in a row. The deflection means comprises deflection electrode means positioned on the side of the print receiving medium opposite the print head means and a means for applying an electrical deflection potential to the deflection electrode means.

The jet drop streams may be directed toward the print receiving medium in a direction nonperpendicular to the surface of the print receiving medium with the electrical potential applied between the print head means and the deflection electrode means to produce a deflection field extending through the print receiving medium in a direction substantially perpendicular to the surface thereof. Such a deflection electrode means may include an electrically conductive electrode plate positioned substantially parallel to the surface of the print receiving medium.

Alternatively, the deflection electrode means may comprise a first deflection electrode of bulk resistive material positioned on the side of the print receiving medium opposite the print head means and means for supplying an electrical deflection potential to opposite ends of the deflection electrode, to induce current flow therethrough in a direction substantially parallel to the row of jet drop streams, thereby producing the deflection field. The print head means in such a printer further includes a second electrode of bulk resistive material defining a plurality of orifices through which associated jet drop streams pass. The second electrode has opposite ends connected to receive an electrical deflection potential. Current flow is induced through the second electrode in a direction substantially parallel to the row of jet drop streams to supplement the deflection field provided by the first deflection electrode.

Other objects and advantages of the invention will be apparent from the following description, the accompanying drawings and the appended claims.

DETAILED DESCRIPTION OF THE PREFERRED EMBODIMENTS

Figure 1:
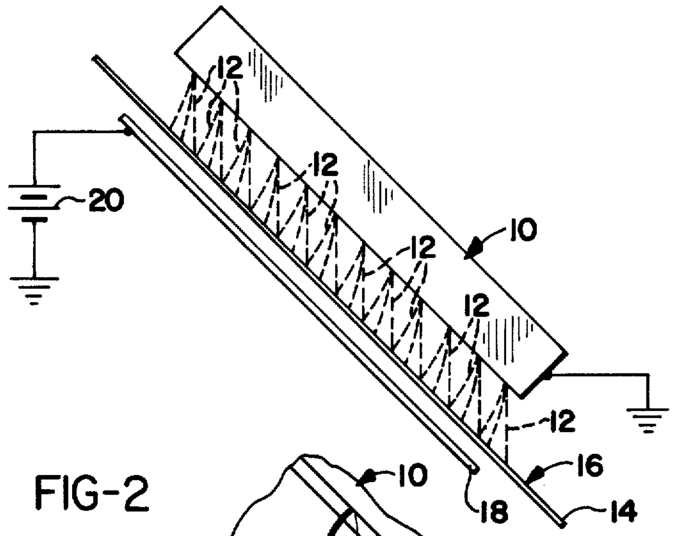
FIG. 1 is a front view illustrating a first embodiment of the ink jet printer of the present invention.

The present invention relates to an ink jet printer and, more particularly, to a printer in which each of a plurality of jet drop streams is utilized to deposit drops of ink at a plurality of print positions across a moving print receiving medium, thereby collectively forming a print image on the medium. FIG. 1 illustrates a first embodiment of the invention. The printer includes an ink jet print head means 10 which generates a plurality of jet drop streams 12 directed toward a moving print receiving medium 14, such that drops are deposited at print positions on the surface 16 of the medium. As seen in FIG. 1, the jet drop streams are generally parallel and are arranged in a row. Each of the drops in the jet drop streams 12 is selectively charged to one of a plurality of charge levels. The print receiving medium 14, which may be a sheet of paper or other material, or a continuous web, is transported in a direction generally normal to the plane of the drawing.

A deflection means is provided for generating a static electrical deflection field extending through the print receiving medium in a direction nonparallel to the jet drop streams 12 for deflecting charged drops in the streams to selected print positions on the print receiving medium. The deflection means may include a deflection electrode means 18, such as a stationary electrically conductive electrode plate, positioned on the side of the medium 14 opposite the print head means 10. The deflection means further includes a voltage source 20 which applies an electrical deflection potential to the deflection electrode means 18. The resulting deflection field extends between the grounded print head 10 and the deflection electrode 18 and is generally perpendicular to the surface 16 of the print receiving medium 14.

Figure 2:
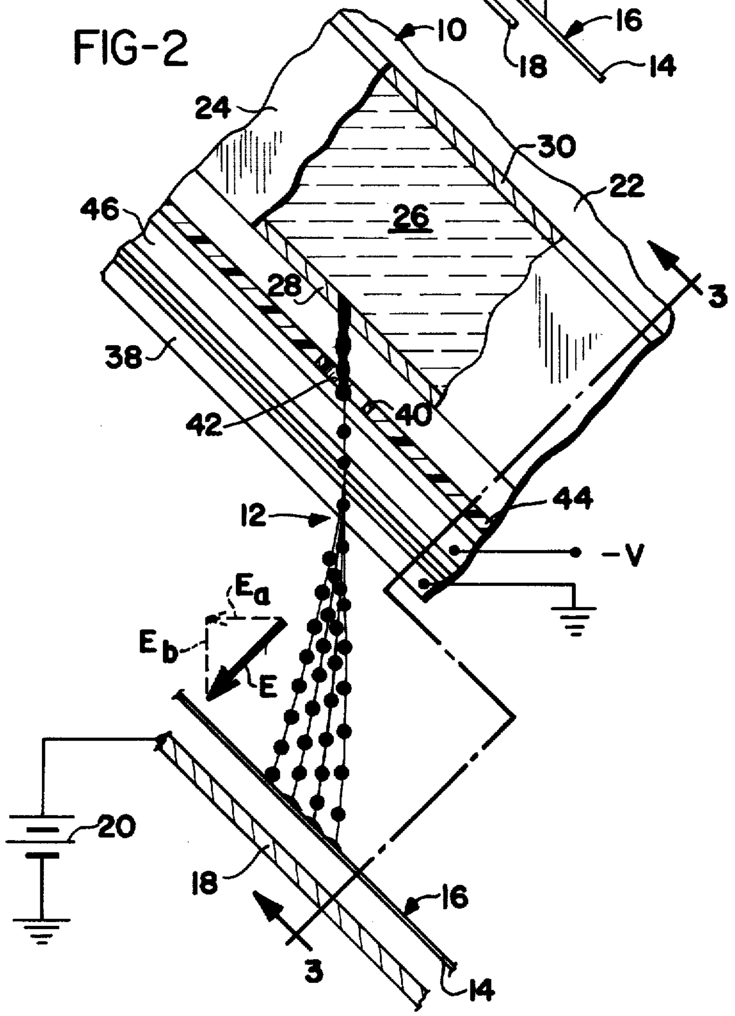
FIG. 2 is an enlarged partial view of the printer of FIG. 1 with a portion of the print head casing removed and portions of the structure broken away to reveal internal structure.

As seen in FIG. 2, jet drop streams 12 are initially directed toward the print receiving medium in a direction nonperpendicular to the surface 16 of the print receiving medium. Only one such jet drop stream is illustrated in the drawing for purposes of clarity. Drops in each jet drop stream are therefore deflected in a direction parallel to the deflection field E by an amount directly related to the charge carried thereon. As a result, each of the jet drop streams may be directed laterally to service a number of print positions across the width of the print receiving medium. It should be appreciated that lateral deflection of the drops results solely from the field component $E_a$ which is normal to the initial trajectory of the stream. The field component $E_b$ serves merely to accelerate the drops in a direction parallel to their initial trajectories.

The print head means is encased within a grounded casing 22 which, in conjunction with the electrode plate 18 and voltage source 20, provides the deflection field. A manifold 24 defines a fluid receiving reservoir 26 in conjunction with orifice plate 28 and flexible stimulator plate 30. Ink is supplied to the reservoir 26 under pressure such that it emerges through a plurality of orifices 32 as fluid filaments 34. Each fluid filament breaks up into a plurality of drops 36, thus forming the jet drop streams 12. A piezoelectric transducer 38 is provided to stimulate plate 30 mechanically, causing bending waves to move along the plate. These waves are coupled to each of the fluid filaments 34 through the fluid in the reservoir 26 such that pressure varicosities are produced in the fluid filaments, thus enhancing break up of the filaments into drops 36.

Figure 3:
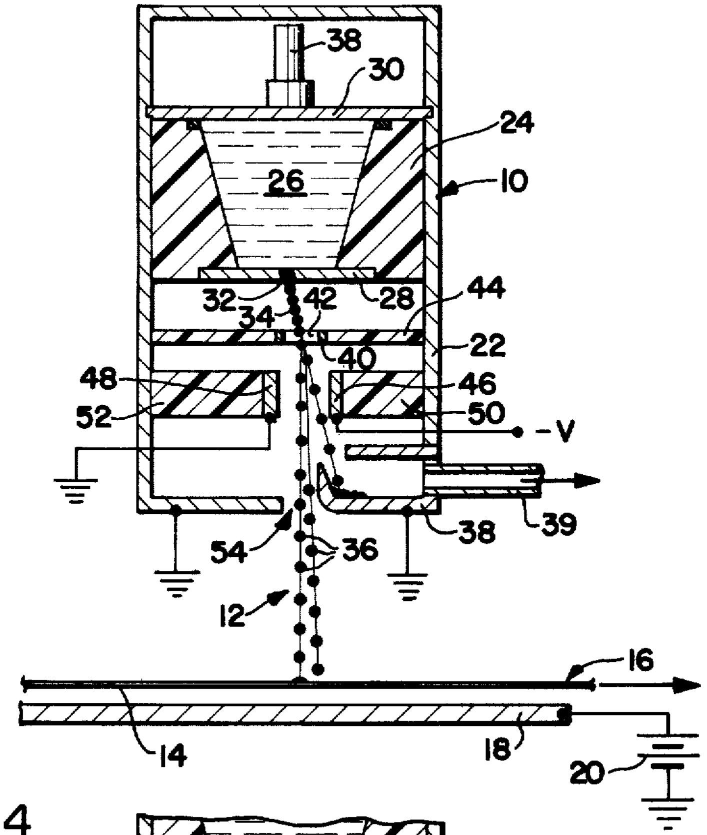
FIG. 3 is a sectional view taken generally along line 3—3 in FIG. 2.

As can be seen in FIG. 3, each filament and the jet streams produced therefrom are initially inclined slightly from vertical in a direction parallel to the direction of movement of the print receiving medium such that if the drops are not deflected within the print head, they strike a catcher 38 and are carried away through vacuum line 39. When it is desired to deposit a drop on the print receiving medium, however, an electrical potential is supplied to an electrically conductive charge ring electrode 40 lining charge opening 42 in charge ring plate 44. A corresponding electrical charge is induced in the tip of fluid filament 34 and this charge is carried away by the drop subsequently formed from the fluid filament tip. The charged drop thereafter enters a deflection field created between opposing deflection electrodes 46 and 48 mounted on nonconductive electrode support plates 50 and 52, respectively. A deflection potential −V is supplied to deflection electrode 46, while opposing deflection electrode 48 is grounded. The drop carries a negative charge, and is deflected by the field between electrodes 46 and 48 into generally a vertical trajectory such that it does not strike the catcher 38. The drop passes out of the print head 10 through slot 54 in the bottom of print head casing 22 and is subsequently laterally deflected to the desired print position.

With such a print head, it will be appreciated that all of the drops emerging from slot 54 have been previously deflected by electrodes 46 and 48 and, therefore, must carry at least a slight electrical charge. As a consequence, as the charged drops move downward toward the print receiving medium 16 and encounter the field extending between print head 10 and the deflection electrode plate 18, each of the drops is deflected by at least a small distance by the lateral component $E_a$ of the deflection field. Additionally, it will be appreciated that since the charged drops in each jet drop stream carry one of a plurality of discrete charge levels, the amount of deflection of the charged drops outward from catcher 38 by the field extending between electrodes 46 and 48 will vary in dependence upon the charge. This variation in trajectory in a direction parallel to the direction of movement of the paper 16 results in the print positions serviced by each jet being aligned in a row which is slightly skewed. Since the paper 16 is moving during servicing of successive laterally displaced print positions, however, this inherent skew in the print position row may be adjusted to compensate for the skew in drop positions which would otherwise result.

A print head is illustrated in FIG. 3 in which the jets are initially inclined slightly to the direction of paper movement. If desired, however, the jets may be generated such that they are initially normal to the direction of paper movement, with the catcher 38 shifted slightly to the left as seen in FIG. 3 such that undeflected drops are caught.

Figure 4:
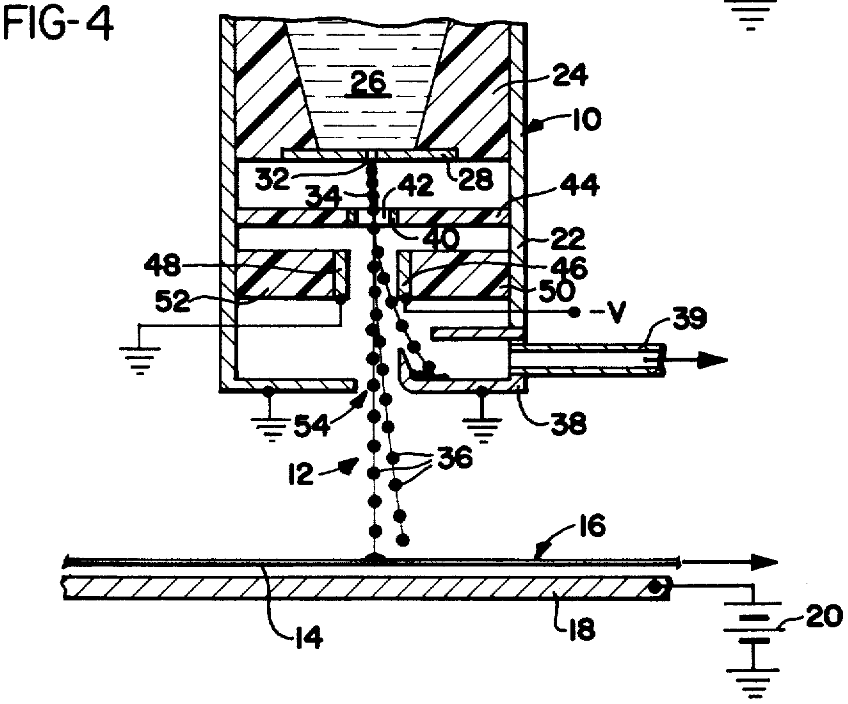
FIG. 4 is a sectional view similar to FIG. 3 illustrating a variation in the construction of the print head.

FIG. 4 illustrates a variation in print head construction which may be utilized if it is desired to include uncharged drops in the jet drop streams for printing. The orifices 32 in orifice plate 28 of the print head are substantially vertical, thereby producing a vertical jet drop stream which does not strike the catcher 38 when the drops in the jet drop streams are uncharged. Instead, uncharged drops in a vertical trajectory pass through slot 54 and travel unaffected through the external deflection field extending between the deflection electrode plate 18 and the print head casing 22. If a drop is not to be printed, a large charge potential is applied to the charge ring 40, with the result that the drop is charged and deflected substantially by the field extending between electrodes 46 and 48 to strike the catcher 38.

Drops which are intended to be utilized for printing but which are to be deflected laterally by the field component $E_a$ of the external deflection field are given one of a plurality of lesser charges such that, although they are deflected slightly by the deflection field between electrodes 46 and 48, nevertheless, they are not deflected sufficiently to strike the catcher 38 and, therefore, pass out of the slot 54 in casing 22. It should be noted that these charged drops are deflected slightly in a direction parallel to the direction of movement of the print receiving medium, as well as being deflected in a direction parallel to the row of jet drop streams. As a consequence, the print positions serviced by each jet are arranged in a line slightly skewed with respect to the jet drop stream row. As discussed previously, this skew may be used to compensate to the skewed positions of the drops which results from successively servicing laterally displaced print positions on a moving print receiving medium.

It will be appreciated that other types of print heads may be utilized in a printer constructed according to the present invention. For example, a printer having a plurality of print on demand nozzles in which jet drops are generated only when printing is required may be used. It will also be appreciated that, if desired, the print head may be operated in such a manner that all of the drops which are to be printed are charged to the same charge level. In such an arrangement, variation in the distance by which drops are deflected to laterally spaced print positions is accomplished by varying the deflection potential supplied to the deflection electrode 18. By utilizing a cyclically varying deflection potential, each of the jets may be caused to be scanned repetitively across the print receiving medium, thus servicing the laterally displaced print positions associated therewith.

Figure 5:
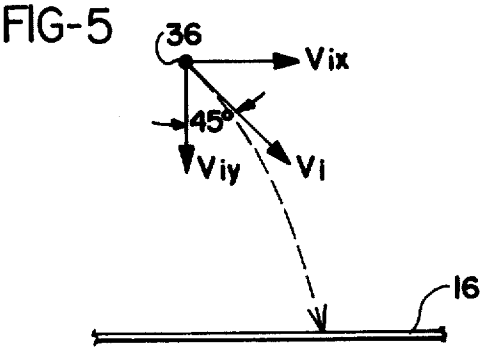
FIG. 5 is a schematic representation of drop trajectory useful in explaining the invention.

The deflection produced by the field arrangement of the printer of FIGS. 1-4 can be calculated as follows, with reference to FIG. 5 of the drawings. A drop is initially directed at a 45° angle with respect to the print receiving medium 16. The x component $V_{ix}$ of the drop velocity $V_i$ is unaffected by the acceleration due to the electrostatic field. The transit time for a drop moving from a jet toward the deflection electrode plate 18 having 1000 volts impressed thereon, assuming 0.6 cm spacing between the print head and the plate 18, can be calculated:

$$Y = \frac{Eqt^2}{2m} + V_{iy}t$$

where $Y = 0.6$ cm, q/m (the charge-to-mass ratio) $= 3\times 10^{-6}$ COUL/gm,

Since, $V_i = 2000$ cm/sec ($V_{iy} = 1414$ cm/sec)

Therefore, $$.6\text{cm} = \frac{(1.67\times 10^{10}\text{dynes/COUL})\,(3\times 10^{-6}\text{COUL/gm})t^2}{2} + 1414t$$

$$.6\text{cm} = (2.505\times 10^{4}\text{dynes/gm})t^2 + (1414\text{cm/sec})t$$

$$.6\text{cm} = (2.505\times 10^{4}\text{cm/sec}^2)t^2 + (1414\text{ cm/sec})t$$

solving by way of the quadratic formal yields:

$t = 3.992\times 10^{-4}$ sec.

during this time period a drop travels a distance X along the plate:

$X = V_{ix}t = (1414\text{ cm/sec})\,(3.992\times 10^{-4}\text{ sec})$ $X = 0.564$ cm If a drop were uncharged, it would travel the following distance along the plate:

$X = 0.6$ cm

Thus 0.036 cm deflection is available.

At a resolution of 537 print positions per inch, deflection of a drop may therefore be made to any of at least seven adjacent print positions across the width of the print receiving medium.

Figure 6:
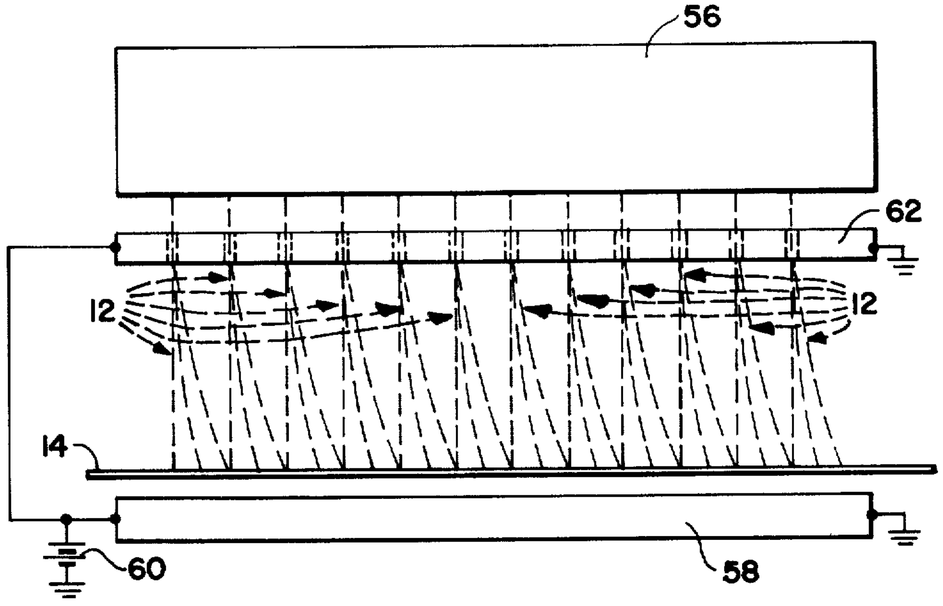
FIG. 6 is a front view of a second embodiment of the printer of the present invention.

Reference is now made to FIG. 6 of the drawings in which an alternative embodiment of the invention is illustrated. The print head 56 is substantially the same as the print head illustrated with respect to the embodiment of FIGS. 1-4, with the exception that the print head produces a row of parallel jet drop streams which are perpendicular to the print receiving medium 14. The medium 14 is transported in a direction normal to the plane of the drawing. Drops in the jet drop streams 12 are selectively charged to one of a plurality of charge levels. A deflection electrode means comprises a first deflection electrode 58 of bulk resistive material which is positioned on the side of the print receiving medium 14 opposite the print head means 56. A voltage source 60, approximately 10000 volts, provides a means for supplying an electrical deflection potential to opposite ends of the deflection electrode 58 to induce current flow therethrough in a direction substantially parallel to the row of jet drop streams 12. Not only is a static electrical field produced within the bulk resistive material 58, but a field is also produced in the region surrounding the electrode 58. This field extends through the print receiving medium 14 and results in lateral deflection of the jet drop streams 12 in a direction parallel to the field. Each drop is therefore deflected by a distance related to the charge which it carries and the drops in the jet drop streams 12 may therefore be deflected to strike the print receiving medium at selected print positions.

If desired, a second electrode 62 of bulk resistive material may be provided and connected as shown to the electrical deflection potential source 60. Electrode 62 defines a plurality of orifices through which associated jet drop streams pass. The electrode 62 provides a deflection field which supplements the deflection field provided by the first deflection electrode 58.

While the forms of apparatus herein described constitute preferred embodiments of the invention, it is to be understood that the invention is not limited to these precise forms of apparatus, and that changes may be made therein without departing from the scope of the invention.

What is claimed is:

1. An ink jet printer for depositing drops at print positions on the surface of a print receiving medium, comprising:
   - print head means for generating a plurality of jet drop streams directed toward said print receiving medium, each drop in said jet drop streams being charged to one of a plurality of charge levels, and
   - deflection means for generating a static electrical deflection field extending through said print receiving medium in a direction nonparallel to said plurality of jet drop streams for deflecting charged drops in said streams to print positions on said print receiving medium.

2. The ink jet printer of claim 1 in which said print head means comprises
   - catcher means for receiving drops in said jet drop streams which are not to be deposited on said surface of said print receiving medium, and
   - electrode means for providing an electrical deflection field to deflect drops in said jet drop streams, thereby separating said drops into catch trajectories in which said drops strike said catcher means and print trajectories in which said drops are directed towards said print receiving medium.

3. The ink jet printer of claim 1 in which said plurality of jet drop streams are parallel and arranged in a row.

4. The ink jet printer of claim 3 in which said deflection electrode means comprises a first deflection electrode of bulk resistive material, positioned on the side of said print receiving medium opposite said print head means, and means for supplying an electrical deflection potential, connected to opposite ends of said deflection electrode, to induce current flow therethrough in a direction substantially parallel to said row of jet drop streams to produce said deflection field.

5. The ink jet printer of claim 4 in which said print head means further comprises a second electrode of bulk resistive material having a plurality of orifices through which associated jet drop streams pass, said second electrode having opposite ends connected to said means for supplying an electrical deflection potential, to induce current flow therethrough in a direction substantially parallel to said row of jet drop streams to supplement the deflection field provided by said first deflection electrode.

6. The ink jet printer of claim 3 in which said deflection means comprises
   - deflection electrode means, positioned on the side of said print receiving medium opposite said print head means, and
   - means for applying an electrical deflection potential to said deflection electrode means.

7. The ink jet printer of claim 6 in which said jet drop streams are directed toward said print receiving medium in a direction nonperpendicular to said surface of said print receiving medium, and in which said means for applying an electrical deflection potential to said deflection electrode means comprises means for supplying an electrical potential between said print head means and said deflection electrode means to produce a deflection field extending through said print receiving medium in a direction substantially perpendicular to said surface of said print receiving medium.

8. The ink jet printer of claim 7 in which said deflection electrode means comprises an electrically conductive electrode plate positioned adjacent said print receiving medium and substantially parallel to said surface of said print receiving medium.

9. An ink jet printer for depositing drops on the surface of a print receiving medium to form a print image thereon, comprising:
   - means for transporting a print receiving medium past a print station,
   - means for generating a plurality of parallel jet drop streams directed toward said print receiving medium at said print station in a direction nonperpendicular with respect to said surface of said print receiving medium, and
   - deflection means for providing a deflection field extending in a direction substantially perpendicular to said surface of said medium, whereby drops in said drop streams pass through and are deflected by said field to strike said medium at a plurality of print positions, thereby collectively forming said print image.

10. The ink jet printer of claim 9 in which said jet drop streams are arranged in a row substantially perpendicular to the direction of movement of said print receiving medium.

11. The ink jet printer of claim 9 in which each of the drops in said plurality of jet drop streams is charged selectively to one of a plurality of charge levels and in which said deflection means includes means for providing a static electrical deflection field.

12. The ink jet printer of claim 11 in which said means for providing a static electrical deflection field comprises
   - electrode means, positioned adjacent said print receiving medium, and means for providing an electrical potential differential between said electrode means and said print head means.

13. An ink jet printer, comprising:

means for transporting a print receiving medium past a print station, print head means for generating a row of substantially parallel jet drop streams directed at a print receiving surface of said print receiving medium, and deflection electrode means positioned on the side of said print receiving medium opposite said print head means for producing a static electrical field having a field component in a direction parallel to said row for deflecting charged drops parallel to said row to a plurality of print positions on said print receiving medium.

14. The ink jet printer of claim 13, in which each drop in said jet drop streams is charged to one of a plurality of charge levels.

15. The ink jet printer of claim 13 in which said print head means comprises catcher means for receiving drops in said jet drop streams which are not to be deposited on said surface of said print receiving medium, and electrode means for providing an electrical deflection field to deflect drops in said jet drop streams, thereby separating said drops into catch trajectories in which said drops strike said catcher means and print trajectories in which said drops are directed towards said print receiving medium.

16. The ink jet printer of claim 13 in which said deflection electrode means comprises a first deflection electrode of bulk resistive material, positioned on the side of said print receiving medium opposite said print head means, and means for supplying an electrical deflection potential, connected to opposite ends of said deflection electrode to induce current flow therethrough in a direction substantially parallel to said row of jet drop streams to produce said deflection field.

17. The ink jet printer of claim 16 in which said print head means further comprises a second electrode of bulk resistive material having a plurality of orifices through which associated jet drop streams pass, said second electrode having opposite ends connected to said means for supplying an electrical deflection potential, to induce current flow therethrough in a direction substantially parallel to said row of jet drop streams to supplement the deflection field provided by said first deflection electrode.

18. The ink jet printer of claim 13 in which said deflection means comprises deflection electrode, positioned on the side of said print receiving medium opposite said print head means, and means for applying an electrical deflection potential to said deflection electrode.

19. The ink jet printer of claim 18 in which said jet drop streams are directed toward said print receiving medium in a direction nonperpendicular to said surface of said print receiving medium, and in which said means for applying an electrical deflection potential to said deflection electrode means comprises means for supplying an electrical potential between said print head means and said deflection electrode means.

20. The ink jet printer of claim 19 in which said deflection electrode means comprises an electrically conductive electrode plate positioned adjacent said print receiving medium and substantially parallel to said surface of said print receiving medium.

* * * * *